United States Patent
Dong et al.

(10) Patent No.: US 12,541,600 B2
(45) Date of Patent: Feb. 3, 2026

(54) METHOD FOR RUNNING STARTUP PROGRAM OF ELECTRONIC DEVICE, AND ELECTRONIC DEVICE

(71) Applicant: HUAWEI TECHNOLOGIES CO., LTD., Guangdong (CN)

(72) Inventors: Deyuan Dong, Wuhan (CN); Fei Zhou, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 18/552,142

(22) PCT Filed: Mar. 23, 2022

(86) PCT No.: PCT/CN2022/082533
§ 371 (c)(1),
(2) Date: Sep. 22, 2023

(87) PCT Pub. No.: WO2022/199622
PCT Pub. Date: Sep. 29, 2022

(65) Prior Publication Data
US 2024/0176887 A1 May 30, 2024

(30) Foreign Application Priority Data

Mar. 25, 2021 (CN) .......................... 202110322576.X

(51) Int. Cl.
*G06F 15/177* (2006.01)
*G06F 9/00* (2018.01)
(Continued)

(52) U.S. Cl.
CPC ............ *G06F 21/575* (2013.01); *G06F 11/14* (2013.01)

(58) Field of Classification Search
CPC ........ G06F 21/575; G06F 11/14; G06F 21/44; G06F 21/572; G06F 9/4401;
(Continued)

(56) References Cited

U.S. PATENT DOCUMENTS 5,793,943 A * 8/1998 Noll ........................ G06F 11/20
714/48
6,757,838 B1 * 6/2004 Chaiken ................ G06F 9/4403
714/E11.133
(Continued)

FOREIGN PATENT DOCUMENTS

| CN | 102419719 A | 4/2012 |
| CN | 104657232 A | 5/2015 |

(Continued)

OTHER PUBLICATIONS

Computer Hope:"Dual BIOS",(Jul. 18, 2024), [online]https://www.computerhope.com/jargon/d/dualbios.htm, total 1 page.
(Continued)

*Primary Examiner* — Xuxing Chen
(74) *Attorney, Agent, or Firm* — WOMBLE BOND DICKINSON (US) LLP

(57) ABSTRACT

Embodiments of this application provide a method for running a boot program of an electronic device, and an electronic device. In the method, the boot program in embodiments of this application may include two BIOSs, where one is a primary BIOS, and the other is a secondary BIOS. The electronic device stores the entire primary BIOS in a first storage, and stores some program blocks in the secondary BIOS in a second storage. When the primary BIOS is damaged, the electronic device may determine storage locations of program blocks in the secondary BIOS in the second storage, load these program blocks into a memory of the electronic device, and then run the program
(Continued)

blocks in the secondary BIOS, so that the electronic device is powered on normally.

16 Claims, 6 Drawing Sheets

(51) Int. Cl.
*G06F 11/14* (2006.01)
*G06F 21/57* (2013.01)

(58) Field of Classification Search
CPC .. G06F 11/1417; G06F 9/44505; G06F 3/064; G06F 8/65; G06F 8/71; G06F 9/44536
See application file for complete search history.

(56) References Cited

U.S. PATENT DOCUMENTS

| | | | | |
|---|---|---|---|---|
| 9,542,195 | B1* | 1/2017 | Astarabadi | G06F 11/1469 |
| 2003/0005277 | A1* | 1/2003 | Harding | G06F 21/575 |
| | | | | 714/E11.133 |
| 2003/0126511 | A1* | 7/2003 | Yang | G06F 9/4401 |
| | | | | 714/39 |
| 2007/0033387 | A1* | 2/2007 | Arnez | G06F 11/1417 |
| | | | | 713/1 |
| 2008/0256352 | A1* | 10/2008 | Chow | G11C 11/5621 |
| | | | | 711/E12.079 |
| 2010/0077194 | A1* | 3/2010 | Zhao | G06F 9/441 |
| | | | | 713/2 |
| 2010/0205423 | A1* | 8/2010 | Shao | G06F 11/1417 |
| | | | | 713/2 |
| 2013/0007724 | A1* | 1/2013 | Lai | G06F 8/654 |
| | | | | 717/173 |
| 2014/0082262 | A1* | 3/2014 | Nachimuthu | G06F 12/0246 |
| | | | | 711/103 |
| 2015/0067388 | A1* | 3/2015 | Xiao | G06F 11/1417 |
| | | | | 714/6.12 |
| 2015/0143172 | A1* | 5/2015 | Huang | G06F 11/2284 |
| | | | | 714/15 |
| 2016/0246585 | A1* | 8/2016 | Li | G06F 8/65 |
| 2018/0253556 | A1* | 9/2018 | Karaginides | G06F 21/572 |
| 2018/0267920 | A1* | 9/2018 | Lin | G06F 13/4282 |
| 2020/0226260 | A1* | 7/2020 | Aggarwal | G06F 21/566 |
| 2020/0250313 | A1* | 8/2020 | Li | G06F 11/1004 |
| 2020/0310774 | A1 | 10/2020 | Zhu et al. | |
| 2021/0117272 | A1* | 4/2021 | Kleppinger | G06F 11/1461 |
| 2022/0067164 | A1* | 3/2022 | Liu | G06F 21/572 |
| 2023/0049419 | A1* | 2/2023 | Dower | G06F 21/575 |
| 2023/0297683 | A1* | 9/2023 | Liu | G06F 21/575 |
| | | | | 713/2 |
| 2025/0097219 | A1* | 3/2025 | Hari | H04L 9/14 |

FOREIGN PATENT DOCUMENTS

| | | |
|---|---|---|
| CN | 105893051 A | 8/2016 |
| CN | 110908847 A | 3/2020 |

OTHER PUBLICATIONS

"Innovative technology beautifies life",(Oct. 24, 2024), [online]https://www.gigabyte.com/microsite/55/tech_081226_dualbios.htm, total 4 pages.

* cited by examiner

METHOD FOR RUNNING STARTUP PROGRAM OF ELECTRONIC DEVICE, AND ELECTRONIC DEVICE

CROSS-REFERENCE TO RELATED APPLICATIONS

This application is a national stage of International Application No. PCT/CN2022/082533, filed on Mar. 23, 2022, which claims priority to Chinese Patent Application No. 202110322576.X, filed on Mar. 25, 2021. Both of the aforementioned applications are hereby incorporated by reference in their entireties.

TECHNICAL FIELD

This application relates to the field of terminal and communication technologies, and in particular, to a method for running a boot program of an electronic device, and an electronic device.

BACKGROUND

A boot program is the first program loaded when an electronic device is booted, and is a bridge between hardware and software of the electronic device. Usually, the boot program is a group of programs fixed on a ROM chip on an interior mainboard of the electronic device. The boot program stores the most important basic input/output program, a power-on self-test program, and a system automatic boot program of a computer, and can read and write information of system settings from CMOS. A main function of the boot program is to enable the underlying and the most direct hardware setting and control for the computer. If the boot program is damaged, the electronic device may not be powered on normally.

The boot program may be a basic input output system (BIOS) that supports a unified extensible firmware interface (UEFI) specification, and is also referred to as a UEFI BIOS. In an UEFI BIOS architecture, the UEFI BIOS is referred to as a BIOS for short in the following descriptions.

Currently, to prevent the electronic device from failing to be powered on due to damage to the boot program, one manner is to build a repair program block in the boot program. When the boot program is damaged, the repair program block may be used to boot the program for repair, to ensure that the electronic device can be powered on normally as much as possible.

In this manner, when the repair program block is damaged, the damaged boot program cannot be repaired, and consequently the electronic device cannot be powered on normally.

SUMMARY

This application provides a method for running a boot program of an electronic device, and an electronic device. When the boot program is damaged, a success rate of normal power-on of the electronic device can be increased without increasing hardware costs.

According to a first aspect, this application provides a method for running a boot program of an electronic device. The electronic device includes a processor, a first storage, and a second storage, the first storage is a read-only memory from which the processor can directly read data, and the second storage is a secondary storage from which the processor reads the data by using a memory. The method includes: The processor obtains a first program block from the first storage and runs the first program block, where the first program block belongs to a first part of the boot program, and is used to implement security authentication before the boot program is run; the processor selects one of a second program block and a third program block as a target program block in a next operation, where the second program block is stored in the first storage, the third program block is stored in the second storage, and both the second program block and the third program block belong to a second part of the boot program, and are configured to run the boot program; and the processor runs the target program block after running of the first program block is completed.

In the foregoing embodiment, the boot program includes two parts. A first part is used to implement security authentication before the boot program is run, and the first program block in the first part is used as a shared program block in a primary BIOS and a secondary BIOS. A second part is used to implement running of the boot program. Primary/secondary separate storage is performed on the second part. For example, an example in which the boot program is a BIOS is used, and the BIOS may be divided into a primary BIOS and a secondary BIOS. The second program block in the second part is a program block in the primary BIOS, and is stored in the first storage, and the third program block is a program block in the secondary BIOS, and is stored in the second storage. Costs of the second storage are low; and some program blocks in the secondary BIOS in the boot program being stored in the second storage may save hardware costs. After the processor completes the security authentication before the boot program is run, the processor may select one of program blocks in the primary BIOS and program blocks in the secondary BIOS to be run until the electronic device is powered on normally. Therefore, even though one BIOS is damaged or incomplete, the processor may run the other BIOS. In this way, the boot program may be more likely to be run normally, to increase a success rate of normal power-on of the electronic device.

With reference to some embodiments of the first aspect, in some embodiments, the method further includes: The processor checks whether the second program block is damaged or complete; and when the second program block is damaged or incomplete, the processor selects the third program block as the target program block in the next operation; or when the second program block is undamaged or complete, the processor selects the second program block as the target program block in the next operation.

In the foregoing embodiment, because the primary BIOS is stored in the first storage, and may be directly read and run by the processor, the processor runs the program blocks in the primary BIOS faster. Therefore, when determining that the program blocks in the primary BIOS is complete or undamaged, the processor may determine that the primary BIOS is run. In this way, time for the processor to determine which BIOS to be run may alternatively be saved. In this case, even though the program blocks in the primary BIOS are incomplete or damaged, the processor may also quickly determine to run the program blocks in the secondary BIOS, so that the electronic device can be powered on normally.

With reference to some embodiments of the first aspect, in some embodiments, the method further includes: The processor checks whether the second program block and the third program block are damaged or complete; and when either of the second program block and the third program block is damaged or incomplete, the processor selects an undamaged or complete program block as the target program block in the next operation; or when both the second program block and the third program block are undamaged or complete, the processor selects a program block with a better version number as the target program block in the next operation.

In the foregoing embodiment, the processor selects one of two program blocks with reference to a case whether the two program blocks are complete or undamaged, and version numbers of the program blocks. If a program block is incomplete or damaged, an undamaged or complete program block may be quickly selected to be run, thereby saving time for powering on the electronic device. If the program blocks are complete or undamaged, the processor selects, with reference to a version number of the primary BIOS and a version number of the secondary BIOS, the processor selects a BIOS with a better version number to be run. In this way, if a BIOS with a later version number is defined as a BIOS with a better version number, the processor selects the BIOS with the later version number to be run. The later version number means that performance of the boot program is better, and hardware and software of the electronic device can be better connected, so that the electronic device can be powered on more smoothly. It may be understood that different manners of defining a better version number may bring different beneficial effects. Details are not described herein again.

With reference to some embodiments of the first aspect, in some embodiments, the processor selects a program block with a better version from the second program block and the third program block as the target program block in the next operation.

In the foregoing embodiment, if the processor selects one of program blocks to be run only based on a version number of the program blocks, the processor can quickly select a program block with better performance to be run, so that the electronic device can be powered on more smoothly.

With reference to some embodiments of the first aspect, in some embodiments, when the processor selects the third program block as the target program block in the next operation, the method further includes: The processor obtains a boot program block in the third program block from the first storage, and runs the boot program block in the third program block, where the boot program block in the third program block is used to determine a storage location of the third program block, and load the third program block into a memory of the electronic device.

In the foregoing embodiment, because the third program block is stored in the second storage, the processor cannot directly read and run the boot program block. In this case, only the boot program block in the third program block needs to be stored in the first storage, thereby saving the hardware costs. The processor may directly read and run the boot program block in the third program block, and load the program blocks in the secondary BIOS in the second storage to a memory that can be directly read and run by the processor, so that the processor can run the program blocks in the secondary BIOS in the second storage.

With reference to some embodiments of the first aspect, in some embodiments, the method further includes: The processor repairs a damaged or incomplete program block; or the processor sends a repair notification.

In the foregoing embodiment, the processor may repair the incomplete or damaged program block, thereby ensuring integrity of the boot program.

With reference to some embodiments of the first aspect, in some embodiments, the method further includes: The processor obtains an upgrade package of the boot program; and the processor selects one of the second program block and the third program block as an upgrade target, and upgrades a selected program block by using the upgrade package.

In the foregoing embodiment, the processor may upgrade the boot program. In this way, performance of the boot program may be improved through upgrade, so that the boot program may be run better.

With reference to some embodiments of the first aspect, in some embodiments, the method further includes: The boot program is a UEFI BIOS that supports a unified extensible firmware interface specification.

According to a second aspect, this application provides a method for upgrading a boot program of an electronic device. The electronic device includes a processor, a first storage, and a second storage, the first storage is a read-only memory from which the processor can directly read data, and the second storage is a secondary storage from which the processor reads data by using a memory. The method includes: The processor obtains an upgrade package of the boot program, where a first program block corresponding to a first part of the boot program is stored in the first storage, and the first program block is used to implement security authentication before the boot program is run; the processor selects one of a second program block and a third program block as a target program block to be upgraded, where the second program block is stored in the first storage, the third program block is stored in the second storage, and both the second program block and the third program block belong to a second part of the boot program, and are configured to run the boot program; and the processor upgrades the target program block based on the upgrade package of the boot program.

In the foregoing embodiment, the processor selects only one of a primary BIOS and a secondary BIOS to be upgraded, and the other is not upgraded. In this way, even though the upgrade fails, a to-be-upgraded BIOS remains complete or undamaged. The processor may still choose to run the to-be-upgraded BIOS, so that the electronic device is powered on normally. If the upgrade succeeds, the to-be-upgraded BIOS may be upgraded next time. This may ensure that performances of both BIOSs are better.

According to a third aspect, this application provides an electronic device. The electronic device includes a processor, a first storage, and a second storage, where the first storage is a read-only memory from which the processor can directly read data, and stores a first program block and a second program block, the first program block belongs to a first part of a boot program and is configured to implement security authentication before the boot program is run, and the second program block belongs to a second part of the boot program and is configured to run the boot program; the second storage is a secondary storage from which the processor reads data by using a memory, the second storage stores a third data block, and a third program block belongs to a second part of the boot program and is configured to run the boot program; the processor is configured to obtain the first program from the first storage, and run the first program block to implement security authentication before the boot program is run; the processor is further configured to select one of the second program block and the third program block as a target program block in a next operation; and after running of the first program block is completed, the processor is configured to run the target program block to run the boot program.

In the foregoing embodiment, the boot program includes two parts. A first part is used to implement security authentication before the boot program is run, and the first program block in the first part is used as a shared program block in a primary BIOS and a secondary BIOS. A second part is used to implement running of the boot program. Primary/secondary separate storage is performed on the second part. For example, an example in which the boot program is a BIOS is used, and the BIOS may be divided into the primary BIOS and the secondary BIOS. The second program block in the second part is a program block in the primary BIOS, and is stored in the first storage, and the third program block is a program block in the secondary BIOS, and is stored in the second storage. Costs of the second storage are low; and some program blocks in the secondary BIOS in the boot program being stored in the second storage may save hardware costs. After the processor completes the security authentication before the boot program is run, the processor may select one of program blocks in the primary BIOS and program blocks in the secondary BIOS to be run until the electronic device is powered on normally. Therefore, even though one BIOS is damaged or incomplete, the processor may run the other BIOS. In this way, the boot program may be more likely to be run normally, to increase a success rate of normal power-on of the electronic device.

With reference to some embodiments of the third aspect, in some embodiments, the processor is further configured to check whether the second program block is damaged or complete; and when the second program block is damaged or incomplete, the processor selects the third program block as the target program block in the next operation; or when the second program block is undamaged or complete, the processor selects the second program block as the target program block in the next operation.

With reference to some embodiments of the third aspect, in some embodiments, the processor is further configured to check whether the second program block and the third program block are damaged or complete; and when either of the second program block and the third program block is damaged or incomplete, the processor selects an undamaged or complete program block as the target program block in the next operation; or when both the second program block and the third program block are undamaged or complete, the processor selects a program block with a better version number as the target program block in the next operation.

With reference to some embodiments of the third aspect, in some embodiments, the processor is configured to select a program block with a better version from the second program block and the third program block as the target program block in the next operation.

With reference to some embodiments of the third aspect, in some embodiments, when selecting the third program block as the target program block in the next operation, the processor is further configured to obtain a boot program block in the third program block from the first storage, and run the boot program block in the third program block, where the boot program block in the third program block is used to determine a storage location of the third program block, and load the third program block into a memory of the electronic device.

With reference to some embodiments of the third aspect, in some embodiments, the processor is further configured to repair a damaged or incomplete program block, or send a repair notification.

With reference to some embodiments of the third aspect, in some embodiments, the processor is further configured to obtain an upgrade package of the boot program; and the processor is configured to select one of the second program block and the third program block as an upgrade target, and upgrade a selected program block by using the upgrade package.

DESCRIPTION OF EMBODIMENTS

Figure 1:
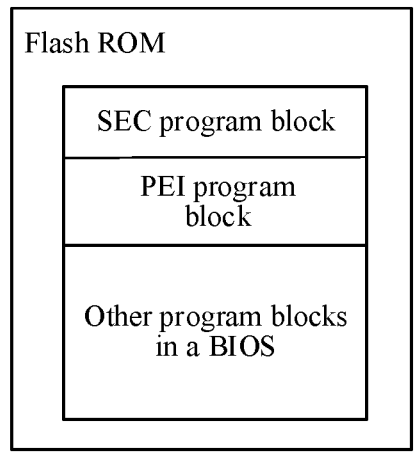
FIG. 1 is a block diagram of a structure of a BIOS according to an embodiment of this application.

Terms used in the following embodiments of this application are merely intended to describe some embodiments, but are not intended to limit this application. As used in the specification of this application and the appended claims, the singular expression "a", "an", "the", "the foregoing", "such a", or "this" is intended to also include a plural expression unless otherwise clearly indicated in the context. It should alternatively be understood that, the term "and/or" used in this application indicates and includes any or all possible combinations of one or more listed items.

The following terms "first" and "second" are merely intended for a purpose of description, and cannot be understood as an indication or implication of relative importance or implicit indication of a quantity of indicated technical features. Therefore, a feature limited by "first" or "second" may explicitly or implicitly include one or more features. In descriptions of embodiments of this application, unless otherwise specified, "a plurality of" means two or more than two.

For ease of understanding, the following first describes related terms and concepts that are involved in embodiments of this application.

(1) First Storage

In embodiments of this application, a first storage includes a storage chip that is fixed on a mainboard of an electronic device and that is used to store a BIOS. Data stored in the first storage may be directly random-accessed by a central processing unit (CPU). The first storage is non-volatile, in other words, in a case of power failure, data information stored in the first storage is not lost.

It may be understood that a primary storage includes not only the first storage, but may also include another storage that can directly exchange information with a CPU of the electronic device, for example, a random access memory (RAM). The primary storage may serve as a memory. It may be understood that the first storage may be directly welded to the mainboard. Alternatively; the first storage may be set on the mainboard in another manner. For example, the first storage is inserted into a card slot on the mainboard to set the first storage on the mainboard. This is limited in embodiments of this application. The first storage may be configured to store some key programs of the electronic device, for example, a boot program and the BIOS. The electronic device may read and write the BIOS stored in the first storage. A program stored on the first storage is usually referred to as firmware.

In some embodiments, the electronic device may read the program stored in the first storage. For example, the electronic device may read the BIOS, then may run the BIOS to complete hardware setting and control, and may further rectify a system fault or diagnose a system problem, to be normally powered on.

Usually, the electronic device is not allowed to erase or change the program or content stored in the first storage. However, in some embodiments, the electronic device may erase the content stored in the first storage, and then write new content. Therefore, in some cases, when a program block in the BIOS is damaged, the electronic device may erase content on the damaged program block, and then write correct content, to ensure that the BIOS can be run normally. In some other cases, when the BIOS needs to be updated and upgraded, the electronic device may erase an original BIOS, and then write the updated and upgraded BIOS into the first storage.

The first storage involved in embodiments of this application may be an erasable flash read-only memory (flash ROM) chip, or may be another type of ROM chip, for example, an electrically erasable programmable read-only memory (EEP ROM). This is not limited herein. A quantity of first storages in embodiments of this application is not limited.

(2) Second Storage

In embodiments of this application, a second storage may include a secondary storage that is not fixed on a mainboard of an electronic device. The second storage may be some extended external memories, for example, a solid state drive (SSD), or a hard disk drive (HDD).

Compared with a first storage fixed on the mainboard of the electronic device, the second storage needs to exchange data information with some primary storages, for example, the first storage, or a random access memory. In other words, another component in the electronic device cannot directly read data information stored in the second storage. For example, a CPU of the electronic device cannot directly access the data information from the second storage, and first needs to load the data information stored in the second storage into a primary storage that may serve as a memory, and obtain the data information from the primary storage. Therefore, to run content in a BIOS stored in the storage, the electronic device needs to first read the content into the primary storage that may serve as the memory, for example, the RAM.

The price of the second storage per unit capacity is lower than the price of the first storage per unit capacity. Using the first storage to store the content in the BIOS can save development costs of the electronic device.

(3) BIOS Running Environment

For a BIOS using a UEFI BIOS architecture, the BIOS may be divided into several program blocks, and in some embodiments, may include the following several program blocks: a security program block (SEC program block), a pre-EFI initialization (PEI) program block, a driver execution environment (DXE) program block, a boot device selection (BDS) program block, a transient system load (TLS) program block, a run time (RT) program block, and the like. After completing running of the foregoing program blocks, an electronic device can be powered on normally.

The SEC program block is used to implement security authentication before the BIOS is run. The electronic device first runs the SEC program block to enter a security authentication phase in the BIOS running environment.

The PEI program block is used to initialize some hardware, for example, may be used to initialize a CPU, a chipset, a mainboard, or some primary storages and secondary storages. The electronic device runs the PEI program block to enter a pre-EFI initialization phase, to prepare an execution environment for a next phase.

The DXE program block is used to complete initialization of all hardware, and the electronic device runs the DEX program block to enter a driver execution environment phase. During this phase, a memory is fully available, and complex work may be done at this phase.

The BDS program block is used to start an operating system, and the electronic device runs the BDS program block to enter a boot device selection phase. The phase mainly executes a boot policy, and main functions include: initializing a console device, loading a device driver, and loading and executing a boot item based on a system setting.

Then, the electronic device runs the TLS program block, the RT program block, and the like until the electronic device is powered on normally.

When the boot program is the BIOS, to avoid that the electronic device cannot be powered on normally after the BIOS is damaged, one solution is to build a repair program block in the BIOS. When the BIOS is damaged, the electronic device may repair the BIOS by using the repair program block.

FIG. 1 is a schematic block diagram of a structure of a BIOS involved in this solution. The BIOS includes an SEC program block, a PEI program block, and other program blocks. The BIOS may be stored on a flash ROM. The PEI program block in the BIOS includes a repair program block.

Figure 2:
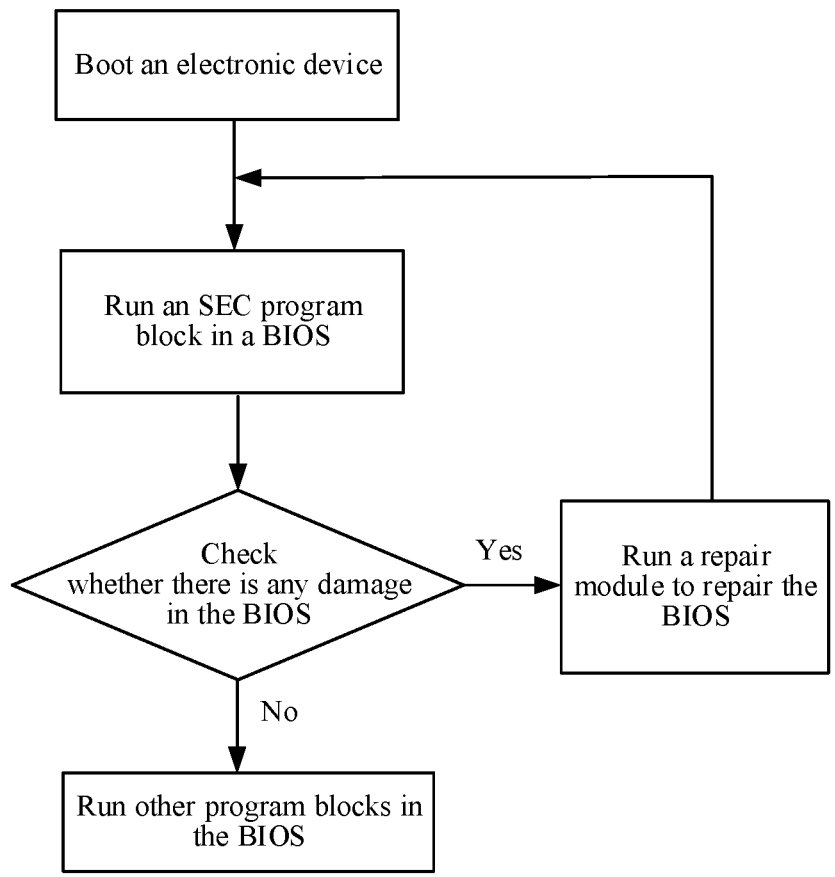
FIG. 2 is a flowchart of running of a BIOS according to an embodiment of this application.

FIG. 2 is a schematic flowchart of running of the BIOS. In response to a power-on operation of a user on an electronic device, the electronic device first runs the SEC program block in the BIOS. Then, the electronic device checks whether the PEI program block is damaged. If the PEI program block is undamaged, the electronic device runs the PEI program block. Then, the electronic device may check whether the other program blocks in the BIOS are damaged. If there is any damage, the electronic device runs the repair program block in the PEI program block to repair the BIOS. A repair process is that the electronic device searches for the other program blocks in the BIOS from an external storage device such as an optical disc, for example, a driver execution environment (DXE) program block and a boot device selection (BDS) program block, and then repairs the BIOS by using the other program blocks on the external memory. If there is no damage, the electronic device may run the other program blocks in the BIOS.

However, when this scheme is adopted, the repair program block needs to depend on the PEI program block to be run. In other words, the repair program block can be run only when the PEI program block is undamaged. If the repair program block in the BIOS is damaged or the PEI program block on which the repair program block depends is damaged, a damaged BIOS cannot be repaired. However, when the BIOS is upgraded, because the PEI program block also needs to be upgraded, a case in which the boot program block is damaged due to an upgrade failure may occur. If the BIOS is damaged in this case, the electronic device may not be powered on normally.

In a method for running the boot program provided in embodiments of this application, an example in which the boot program is the BIOS is still used. A primary BIOS and a secondary BIOS are split and stored in different storages, and the entire primary BIOS is stored in a first storage. Some program blocks in the secondary BIOS are stored in a second storage. When the primary BIOS is damaged, the electronic device may determine storage locations of program blocks in the secondary BIOS in the second storage, load these program blocks into a memory of the electronic device, and then run the program blocks in the secondary BIOS, so that the electronic device is powered on normally, and a success rate of normal power-on of the electronic device is increased without increasing hardware costs. The electronic device may further obtain an upgrade package of the boot program, to upgrade either a primary boot program or a secondary boot program.

Figure 3:
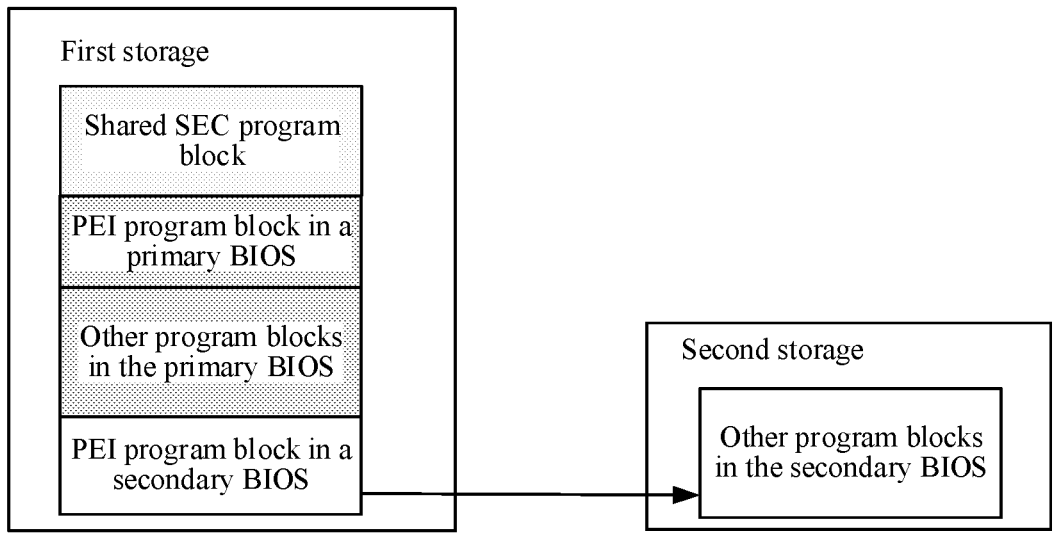
FIG. 3 is a block diagram of a structure of a primary BIOS and a secondary BIOS according to an embodiment of this application.

FIG. 3 is a schematic block diagram of a structure of a primary BIOS and a secondary BIOS according to an embodiment of this application.

In some embodiments, an SEC program block in the primary BIOS and an SEC program block in the secondary BIOS may be a same SEC program block, and the SEC program block is a shared SEC program block.

As shown in FIG. 3, an electronic device may store, in a first storage, the shared SEC program block in the primary BIOS and the secondary BIOS. The first storage is further configured to store a PEI program block in the primary BIOS, a PEI program block in the secondary BIOS, and another program block in the primary BIOS. The electronic device stores other program blocks in the secondary BIOS in a second storage.

The PEI program block in the secondary BIOS is used to determine storage locations of blocks of the other program blocks in the secondary BIOS in the second storage, and load these program blocks into a memory of the electronic device.

Figure 4:
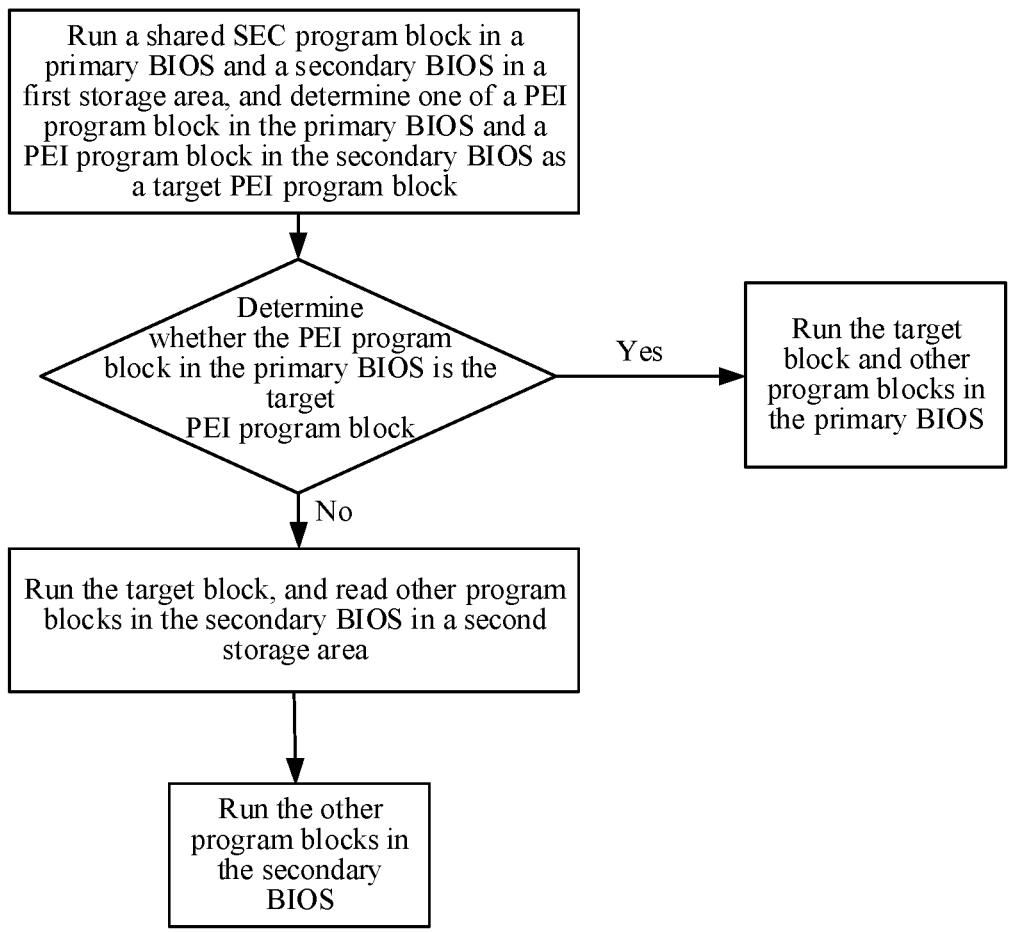
FIG. 4 is a flowchart of running of a boot program according to an embodiment of this application.

FIG. 4 is a schematic flowchart of running of a boot program according to an embodiment of this application.

As shown in FIG. 4, an electronic device first runs a shared SEC program block in a primary BIOS and a secondary BIOS in a first storage, determines one of a PEI program block in the primary BIOS and a PEI program block in the secondary BIOS as a target PEI program block, and runs the target PEI program block. If the PEI program block in the primary BIOS is the target PEI program block, another program block in the primary BIOS is run, so that the electronic device is powered on normally. If the PEI program block in the primary BIOS is not the target PEI program block, the PEI program block in the secondary BIOS is the target PEI program block. In this case, the electronic device may run the target PEI program block to read another program block in the secondary BIOS in the second storage, and then run the another program block in the secondary BIOS, so that the electronic device is powered on normally.

In this way, without increasing hardware costs, provided that the shared SEC program block is undamaged and completes security authentication before the boot program is run, the boot program may be run. Even though the PEI program block or the another program block in the primary BIOS in the first storage is damaged, when the electronic device cannot be powered on successfully by running the primary BIOS, the electronic device may also run the PEI program block and the another program block in the secondary BIOS, so that the electronic device can be powered on normally, and a success rate of normal power-on of the electronic device is increased.

The electronic device may upgrade the shared SEC program block by using an upgrade package of the boot program, and select one of other program blocks except the shared SEC program block in the primary BIOS and other program blocks except the shared SEC program block in the secondary BIOS to upgrade. In this way, when the SEC program block is successfully upgraded, even though upgrade of other program blocks in one BIOS fails, the other BIOS may still be run, so that the electronic device is powered on normally.

The following first describes an example electronic device 100 according to an embodiment of this application.

Figure 5:
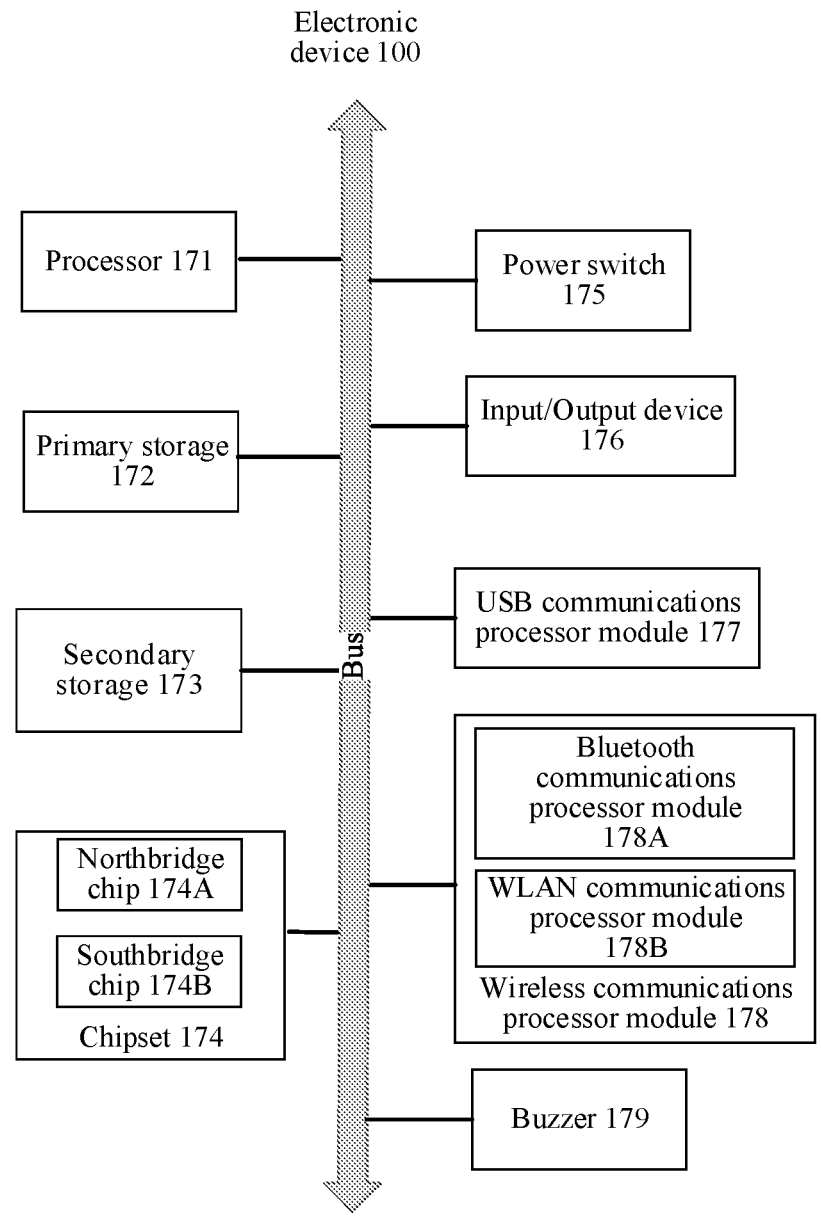
FIG. 5 is a diagram of a structure of an electronic device 100 according to an embodiment of this application.

FIG. 5 is a schematic diagram of a structure of an electronic device 100 according to an embodiment of this application.

The following uses the electronic device 100 as an example to describe this embodiment in detail. It should be understood that the electronic device 100 may have more or fewer components than those shown in the figure, or may combine two or more components, or may have different component configurations. Various components shown in the figure may be implemented in hardware including one or more signal processing and/or application-specific integrated circuits, software, or a combination of hardware and software.

The electronic device 100 may include a processor 171, a primary storage 172, a secondary storage 173, a chipset 174, a power switch 175, an input/output device 176, a USB communications processor module 177, a wireless communications processor module 178, and a buzzer 179.

The processor 171 may be configured to read and run computer-readable instructions. In some implementations, the processor 171 may mainly include a controller, an arithmetic unit, and a register. The controller is mainly responsible for decoding instructions and sending a control signal for an operation corresponding to the instructions. The arithmetic unit is mainly responsible for performing a fixed-point or floating-point arithmetic operation, a shift operation, a logical operation, and the like, and may also perform an address operation and address translation. The register is mainly responsible for storing a quantity of register operations, intermediate operation results, and the like that are temporarily stored during instruction execution.

In this embodiment of this application, the processor 171 may be further configured to read and run instructions involved in a BIOS, so that the electronic device 100 may be powered on normally.

The primary storage 172 is coupled to the processor 171, and is configured to store software programs and/or a plurality of groups of instructions. The software programs and/or the plurality of groups of instructions in the primary storage 172 may be directly read by the processor 171. In an implementation, the primary storage 172 may include a memory, for example, a RAM chip. The primary storage 172 may further include a non-volatile memory chip, for example, one or more flash memory devices. The primary storage 172 may store an operating system, for example, an embedded operating system such as a real-time multi-task operating system (RTOS), a Microsoft Windows operating system, and the like.

In this embodiment of this application, the primary storage 172 may further include a first storage, for example, a flash ROM chip or another type of ROM chip, for example, an EEP ROM chip, and may be configured to store a shared SEC program block, a PEI program block and other program blocks in a primary BIOS, and a PEI program block in a secondary BIOS.

The secondary storage 173 is configured to store various resources, for example, a picture, an audio, and a video. In an implementation, the secondary storage 173 may be an external memory, and may include a mass storage device, for example, a disk storage device. The secondary storage 173 may exchange information with the primary storage 172.

In this embodiment of this application, the secondary storage 173 may further include a second storage, for example, an SSD and an HDD, and is configured to store some program blocks in the secondary BIOS.

The chipset 174 may include one or more of a northbridge chip 174A and a southbridge chip 174B, and is configured to connect a microprocessor (not shown) to other parts of the electronic device 100.

The northbridge chip 174A may be configured to provide interfaces among the processor 171 and other parts of the electronic device 100, for example, may be configured to provide an interface to the primary storage 172. In addition, the northbridge chip 174A may be further configured to provide a network communication function by using a gigabit Ethernet adapter (GEA) (not shown).

The southbridge chip 174B may be configured to control an input/output function of the electronic device 100. In an implementation, the southbridge chip 174B may provide one or more universal serial bus (USB) ports, an audio adapter, an Ethernet controller, and one or more general-purpose input/output pins.

In this embodiment of this application, the southbridge chip 174B may further provide the bus for connecting to a peripheral device, for example, a SCSI host bus adapter (not shown) that complies with a BIOS boot specification (BBS) standard.

In some other embodiments, the southbridge chip 174B may also provide one or more interfaces that may be used to connect the secondary storage 173 to the electronic device 100, so that the secondary storage 173 may exchange information with the primary storage 172. In this way, the electronic device 100 may read some program blocks in the secondary BIOS stored in the secondary storage 173 into the primary storage 172, so that the processor 171 may read and run some program blocks in the secondary BIOS from the primary storage 172.

The power switch 175 may be configured to control a power supply to supply power to the electronic device 100. After the power switch is turned on, the electronic device 100 may start to run the BIOS, and after normal running of the BIOS is completed, the electronic device 100 may be powered on normally.

The input/output device 176 is configured to provide several input/output ports, for example, a keyboard port, a mouse port, a serial interface, or a parallel port. The input device includes a keyboard, a mouse, and a camera. The output device may include a display screen, a printer, and a graphics plotter.

In this embodiment of this application, after the electronic device 100 completes normal running of the BIOS, a power-on user interface may be displayed on the display screen of the electronic device 100.

The USB communications processor module 177 may be configured to communicate with another device by using a USB interface (not shown).

The wireless communications processor module 178 may include one or more of a Bluetooth (BT) communications processor module 178A and a WLAN communications processor module 178B, and is configured to establish a wireless communication connection to another electronic device.

The buzzer 179 is configured to serve as a sound-producing device.

In this embodiment of this application, when the electronic device verifies whether a problem occurs on the hardware during running the BIOS, if a problem occurs on a piece of hardware, the buzzer 179 generates a BIOS alarm sound. Different sound types indicate different hardware problems. For example, in some electronic devices, a long and short BIOS alarm sound indicates a problem with the RAM or a mainboard.

It may be understood that the electronic device 100 in this embodiment of this application may alternatively be a mobile device. This is not limited herein.

With reference to the schematic diagram of the structure of the electronic device 100 shown in FIG. 5, the following describes a method for running a boot program in an embodiment of this application.

Figure 6:
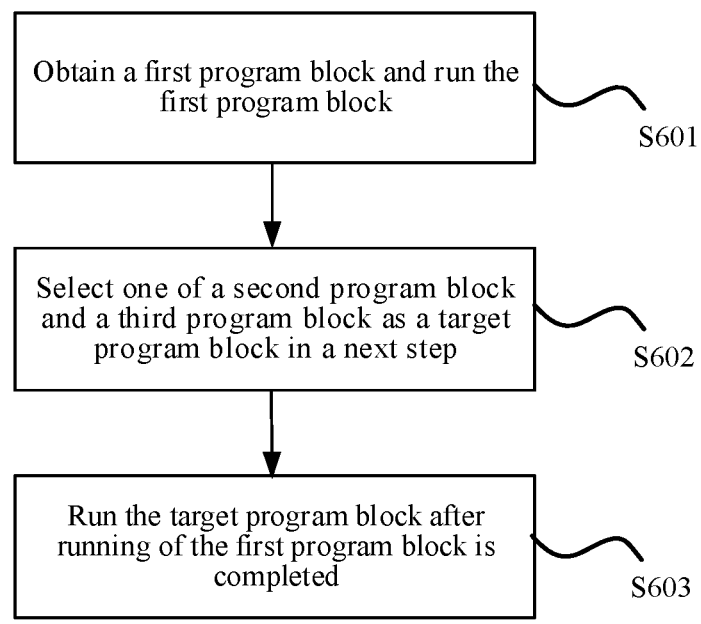
FIG. 6 is a flowchart of an example of running of another boot program according to an embodiment of this application.

FIG. 6 is a flowchart of an example of running of a boot program in an embodiment of this application.

The boot program in this embodiment of this application may include two parts: a first part and a second part. The first part may be used to implement security authentication before the boot program is run, that is, verify whether a CPU, a chipset, a mainboard, and the like may work safely and normally. Only after completing the security authentication of the boot program, an electronic device can run the boot program. In some embodiments, the first part may be further configured to check whether a program block in the second part is complete or damaged, and a version number. Only after normal running of a program block in the first part is completed, the program block in the second part may be run, and the second part may be used to run the boot program. The electronic device may perform primary/secondary separate storage on the second part. For example, an example in which the boot program is a BIOS is used, and the BIOS may be divided into a primary BIOS and a secondary BIOS.

The first part may include a first program block, and the second part may include a second program block and a third program block. For an example running process of these program blocks, refer to the following operation S601 to operation S603.

S601: The electronic device obtains the first program block and runs the first program block.

The first program block is stored in a first storage, and may be directly read by a processor of the electronic device. The first program block belongs to the first part of the boot program and is used to implement the security authentication before the boot program is run. The first program block belongs to both the primary BIOS and the secondary BIOS, and is a shared program block in the two BIOSs. For example, the first program block may include an SEC program block. The SEC program block is a shared SEC program block.

S602: The electronic device selects one of the second program block and the third program block as a target program block in a next operation.

Both the second program block and the third program block belong to the second part of the boot program, and are used to run the boot program. The second program block is a program block in the primary BIOS, and is stored in the first storage. The third program block is a program block in the secondary BIOS, and is stored in a second storage.

For the second program block and the third program block, in a power-on process, the electronic device can select only one of the second program block and the third program block as the target program block in the next operation.

In some embodiments, the electronic device may check only whether the second program block is damaged or complete. If the second program block is undamaged or complete, the second program block is selected as the target program block in the next operation. If the second program block is damaged or incomplete, the third program block is selected as the target program block in the next operation.

In some embodiments, a first electronic device may check whether the second program block is damaged or complete, and may also check whether the third program block is damaged or complete. If either of the second program block and the third program block is damaged or incomplete, an undamaged or complete program block is selected as the target program block in the next operation. If both the two program blocks are complete, version numbers of the two program blocks are checked, and one with a better version number is selected from the two program blocks as the target program block. For example, a program block with a later version number may be defined as better, or a version number with a more stable version number may be defined as better, or there may be another manner in which a version number is defined as better. This is not limited in this embodiment of this application.

In some embodiments, the electronic device may check only version numbers of the second program block and the third program block, and select one with a better version number from the two program blocks as the target program block.

In the foregoing embodiment, for a damaged or incomplete program block, the electronic device may send a repair notification to repair the program block. In some embodiments, based on the repair notification, the electronic device may repair a damaged or incomplete BIOS by using an undamaged or complete BIOS.

In the foregoing embodiment, the electronic device may check, by using the first program block, whether the second program block and the third program block are complete or damaged, and the version numbers. In some embodiments, the first program block may check the second program block and the third program block by using a check program block. In some embodiments, the check program block may be set in the first program block. In some other embodiments, the check program block may alternatively be set outside the first program block, provided that the check program block can be found by using the first program block. For example, a path of the check program block is set in the first program block, and the first program block may find the check program block via the path.

In the foregoing embodiment, because the third program block is stored in the second storage, a boot program block in the third program block may be added to the first storage, to determine a storage location of the third program block, and load the third program block into a memory of the electronic device. The electronic device may check the third program block by using the check program block. In some embodiments, the electronic device finds the boot program block in the third program block by using the check program block, and then checks the third program block by using the boot program block in the third program block.

The second program block may include all other program blocks except the first program block in the primary BIOS. For example, when the first program block includes only the SEC program block, the second program block includes all other program blocks except the SEC program block in the primary BIOS.

The boot program block in the third program block includes at least a part of program blocks that are in a PEI program block in the secondary BIOS and that are used to determine a storage location of the third program block and load the third program block to the memory of the electronic device. The third program block may include all other program blocks except the boot program block in the third program block and the first program block in the secondary BIOS. For example, when the boot program block in the third program block includes only the PEI program block, and the first program block includes an SEC block, the third program block may include a DEX program block, a BDS program block, and the like. When the boot program block in the third program block includes the PEI program block and the DEX program block, and the first program block includes the SEC block, the third program block may include the BDS program block, and the like.

S603: The electronic device runs the target program block after running of the first program block is completed.

It may be understood that a program block in this embodiment of this application may be a group of code, a group of functions, hardware including one or more signal processing and/or application-specific integrated circuits, or one or a combination of more thereof. This is not limited in this embodiment of this application.

In addition to performing operation S601 to operation S603 to run the boot program, the electronic device may further upgrade the boot program.

In some embodiments, the electronic device obtains an upgrade package of the boot program, and upgrades the program block by using the upgrade package. The electronic device obtains the first program block from the first storage, and upgrades the first program block.

The electronic device selects one of the second program block and the third program block as a target program block to be upgraded in the next operation.

After the first program block is upgraded, the electronic device upgrades the target program block.

The following provides detailed example description with reference to the foregoing descriptions of the method for running the boot program in embodiments of this application in FIG. 6.

Figure 7:
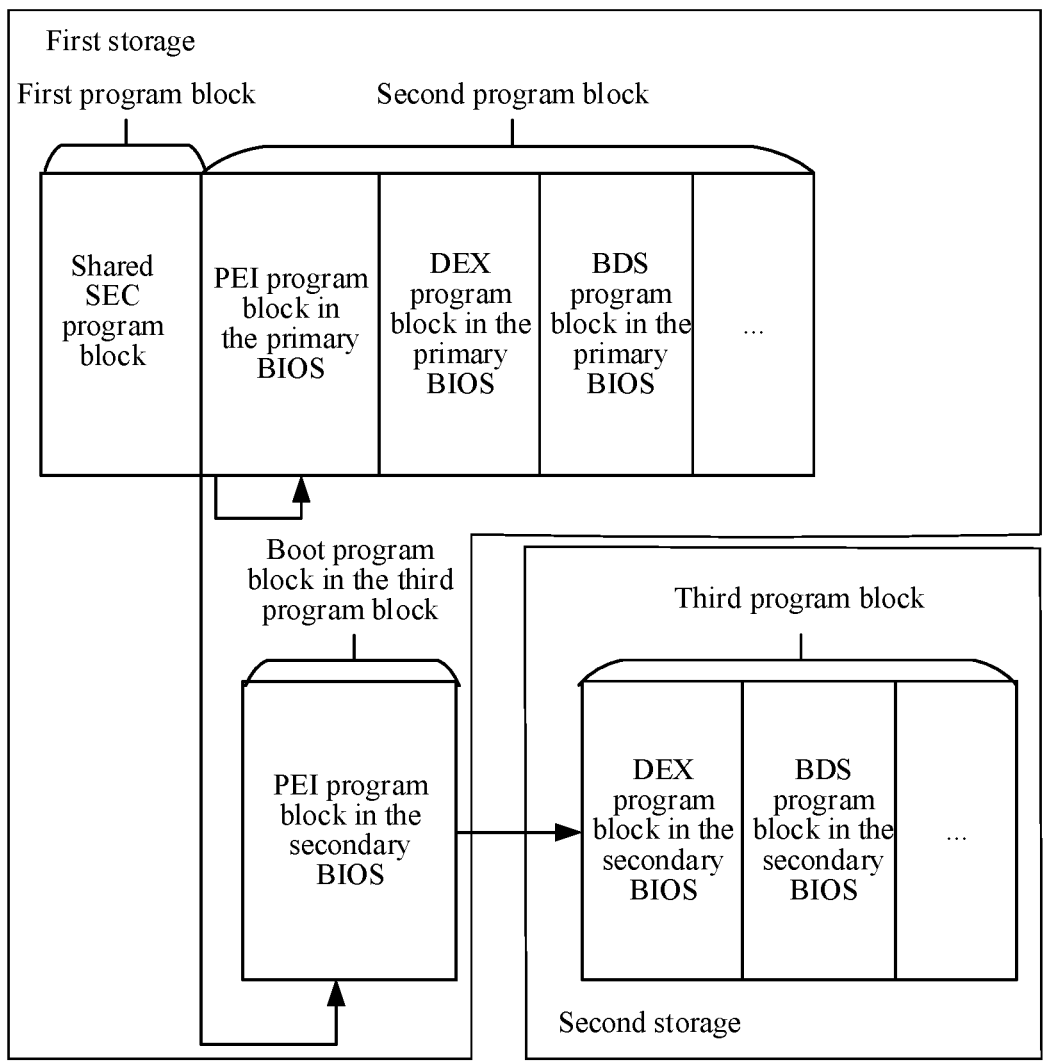
FIG. 7 is a block diagram of a structure of a boot program according to an embodiment of this application.

FIG. 7 is a schematic block diagram of a structure of a boot program according to an embodiment of this application.

It should be understood that a BIOS in FIG. 7 may have more program blocks than those shown in the figure, and two or more program blocks may be combined. Various program blocks shown in the figure may be implemented in hardware including one or more signal processing and/or application-specific integrated circuits, software, or a combination of hardware and software.

A first program block is a shared SEC program block. A second program block is another program block except an SEC program block in a primary BIOS. A boot program block in a third program block is a PEI program block in a secondary BIOS. The third program block is another program block except the PEI program block and the shared SEC program block in the secondary BIOS.

The following describes the method in embodiments of this application with reference to the schematic diagram of the structure of the electronic device 100 shown in FIG. 6 and the schematic block diagram of the structure of the boot program shown in FIG. 7.

Figure 8:
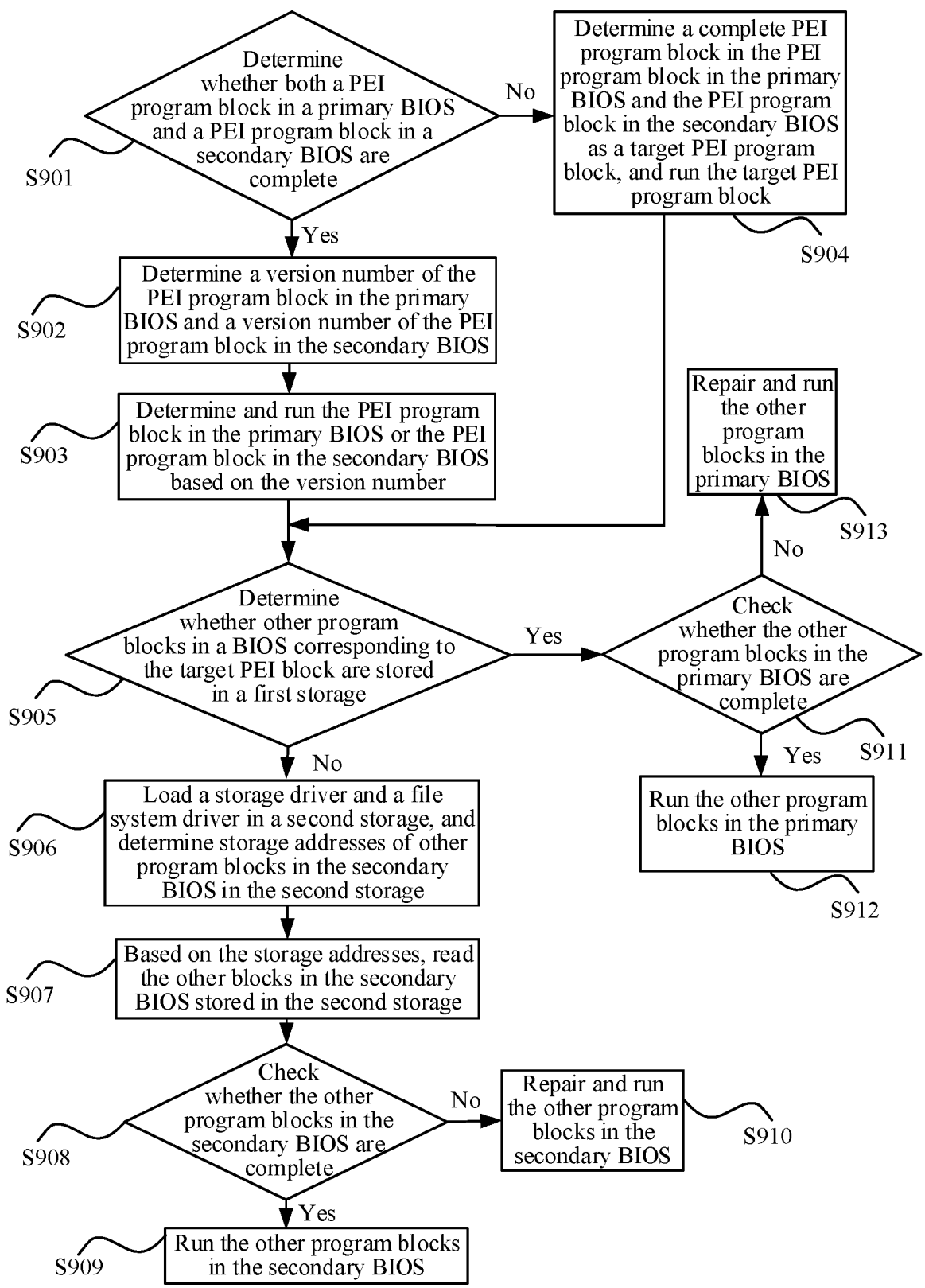
FIG. 8 is a flowchart of an example of a method for running a boot program according to an embodiment of this application.

FIG. 8 is a flowchart of an example of a method for running a boot program in an embodiment of this application.

A first storage stores two PEI program blocks: a PEI program block in a primary BIOS and a PEI program block in a secondary BIOS. However, during running of the boot program, only one of the two PEI program blocks needs to be run. Therefore, an electronic device may determine one of the two PEI program blocks as a target PEI program block, and run the target PEI program block. If selecting a second program block as a target program block, the electronic device runs the PEI program block in the primary BIOS. If selecting a third program block as a target program block, the electronic device runs the PEI program block in the secondary BIOS.

For a process in which the electronic device selects the target PEI program block, refer to the following descriptions of operation S901 to operation S904.

S901: The electronic device determines whether both the PEI program block in the primary BIOS and the PEI program block in the secondary BIOS are complete.

The electronic device may determine whether the PEI program block in the primary BIOS and the PEI program block in the secondary BIOS are complete by running a check program block.

In some embodiments, the check program block may be set in a shared SEC program block.

In some other embodiments, the check program block may not be set in the shared SEC program block, and may be set, when the shared SEC program block is run, in another location that may be read by the electronic device. This is not limited herein.

In some embodiments, if determining that both the PEI program block in the primary BIOS and the PEI program block in the secondary BIOS are complete, the electronic device performs operation S902 and operation S903.

If determining that the PEI program block in the primary BIOS is complete, and the PEI program block in the secondary BIOS is incomplete, or if determining that the PEI program block in the primary BIOS is incomplete, and the PEI program block in the secondary BIOS is complete, the electronic device performs operation S904.

It may be understood that if determining that both the PEI program block in the primary BIOS and the PEI program block in the secondary BIOS are incomplete, the electronic device ends running a BIOS.

S902: The electronic device determines a version number of the PEI program block in the primary BIOS and a version number of the PEI program block in the secondary BIOS.

The electronic device may determine the version number of the PEI program block in the primary BIOS and the version number of the PEI program block in the secondary BIOS by running the check program block.

S903: The electronic device determines and runs the PEI program block in the primary BIOS or the PEI program block in the secondary BIOS based on the version number.

The electronic device determines the target PEI program block by running an SEC program block, and runs the target PEI program block.

In some embodiments, the electronic device may determine a PEI program block with a later version number in the PEI program block in the primary BIOS and the PEI program block in the secondary BIOS as the target PEI program block. For example, if the version number of the PEI program block in the primary BIOS is later than the version number of the PEI program block in the secondary BIOS, the electronic device determines the PEI program block in the primary BIOS as the target PEI program block.

In some embodiments, the electronic device may determine a PEI program block with a more stable version number as the target PEI program block based on the version numbers of the two PEI program blocks. For example, the electronic device may determine, based on the version number of the PEI program block in the secondary BIOS, that the secondary BIOS corresponding to the version number is a test version, and may determine, based on the version number of the PEI program block in the primary BIOS, that the primary BIOS corresponding to the version number is a stable version. Therefore, the electronic device determines the PEI program block in the primary BIOS as the target PEI program block.

In some other embodiments, because the electronic device runs the PEI program block in the primary BIOS faster, if the version numbers of the two PEI program blocks are the same, the electronic device may determine that the PEI program block in the primary BIOS is the target PEI program block.

S904: The electronic device determines a complete PEI program block in the PEI program block in the primary BIOS and the PEI program block in the secondary BIOS as the target PEI program block, and runs the target PEI program block.

If the PEI program block in the primary BIOS is incomplete, and the PEI program block in the secondary BIOS is complete, the electronic device may determine the PEI program block in the secondary BIOS as the target PEI program block, and run the target PEI program block.

If the PEI program block in the primary BIOS is complete, and the PEI program block in the secondary BIOS is incomplete, the electronic device may determine the PEI program block in the primary BIOS as the target PEI program block, and run the target PEI program block.

After performing operations S901 to S904, and determining and running the target PEI program block, the electronic device may determine whether other program blocks in a BIOS corresponding to the target PEI program block are stored in the first storage or a second storage. If the other program blocks are stored in the first storage, the electronic device selects the second program block as the target program block. If the other program blocks are stored in the second storage, the electronic device selects the third program block as the target program block. For this process, refer to the following descriptions of operation S905.

S905: The electronic device determines whether the other program blocks in the BIOS corresponding to the target PEI program block are stored in the first storage.

If running the PEI program block in the primary BIOS, the electronic device may determine that the other program blocks in the BIOS corresponding to the target PEI program block are stored in the first storage, and operation S911 to operation S913 are performed.

If running the PEI program block in the secondary BIOS, the electronic device may determine that the other program blocks in the BIOS corresponding to the target PEI program block are stored in the second storage, and operation S906 to operation S909 are performed.

It may be understood that in some embodiments, when determining that the PEI program block in the primary BIOS is the target PEI program block, the electronic device may not perform operation S905, and may perform operation S911 and operation S912 directly.

When determining that the PEI program block in the secondary BIOS is the target PEI program block, the electronic device may not perform operation S905, and may directly perform operation S906 to operation S910.

In this embodiment of this application, the electronic device reads program blocks in the BIOS stored in the first storage and program blocks in the BIOS stored in the second storage in different manners.

In some embodiments, a processor of the electronic device may directly read the program blocks in the BIOS from the first storage.

The processor of the electronic device may not directly read the program blocks in the secondary BIOS from the second storage.

Because all other program blocks except the shared SEC program block and the PEI program block in the secondary BIOS are stored in the second storage, when reading the program blocks stored in the second storage, the electronic device first needs to read these program blocks into a primary storage, and then runs these program blocks.

For a process in which the electronic device reads and runs the other program blocks in the secondary BIOS stored in the second storage, refer to the following descriptions of operations S906 to S909.

S906: Load a storage driver and a file system driver in the second storage, and determine storage addresses of the other program blocks in the secondary BIOS in the second storage.

In this operation, the electronic device may determine storage locations of the other program blocks in the secondary BIOS in the second storage by running the PEI program block in the secondary BIOS, that is, find the other program blocks in the secondary BIOS. The PEI program block in the secondary BIOS includes the storage addresses of the other program blocks in the secondary BIOS in the second storage.

S907: Based on the storage addresses, read the other program blocks in the secondary BIOS stored in the second storage.

The electronic device may read the other program blocks in the BIOS stored in the second storage.

In some embodiments, the electronic device may load, by running the PEI program block in the secondary BIOS, the other program blocks in the secondary BIOS stored in the second storage to a memory based on the storage addresses that is in the second storage and that is of the other program blocks in the secondary BIOS in the PEI program block in the secondary BIOS, and then read the other program blocks in the secondary BIOS from the primary storage.

S908: The electronic device checks whether the other program blocks in the secondary BIOS are complete.

Before running the other program blocks in the secondary BIOS, the electronic device needs to check whether these program blocks are complete, and may run these program blocks only when these program blocks are complete.

In some embodiments, the other program blocks in the secondary BIOS may include a DXE program block in the secondary BIOS, a BDS program block in the secondary BIOS, and the like. Before running a next program block, the electronic device checks, by using a currently run program block, whether the next program block is complete. For example, when running the PEI program block in the secondary BIOS, the electronic device may check, by using the PEI program block, whether the DXE program block in the secondary BIOS. When running the DXE program block, the electronic device may check the BDS program block in the secondary BIOS by using the DXE program block.

If the other program blocks in the secondary BIOS are complete, operation S909 is performed.

If the other program blocks in the secondary BIOS are incomplete, operation S910 is performed.

S909: The electronic device runs the other program blocks in the secondary BIOS.

The electronic device runs the other program blocks in the secondary BIOS until the running ends and the electronic device is powered on normally.

S910: The electronic device repairs and runs the other program blocks in the secondary BIOS.

In some embodiments, when the other program blocks in the secondary BIOS are incomplete, the electronic device may repair the other program blocks in the secondary BIOS, and then continue to run the other program blocks in the secondary BIOS, so that the electronic device can be powered on normally.

S911: The electronic device checks whether other program blocks in the primary BIOS are complete.

For a process in which the electronic device checks whether the other program blocks in the primary BIOS are complete, refer to the descriptions of the electronic device checking whether the other program blocks in the secondary BIOS are complete in operation S908. Details are not described herein again.

If the other program blocks in the primary BIOS are complete, operation S912 is performed.

If the other program blocks in the primary BIOS are incomplete, operation S913 is performed.

S912: The electronic device runs the other program blocks in the primary BIOS.

The electronic device runs the other program blocks in the primary BIOS until the running ends and the electronic device is powered on normally.

S913: The electronic device repairs and runs the other program blocks in the primary BIOS.

For a process in which the electronic device repairs and runs the other program blocks in the primary BIOS, refer to the descriptions of the electronic device repairing and running the other program blocks in the secondary BIOS in operation S910. Details are not described herein again.

In some embodiments, when determining that the PEI program block in the primary BIOS is complete, the electronic device may not need to determine whether the PEI program block in the secondary BIOS is complete, and directly determine the PEI program block in the primary BIOS as the target PEI program block. Then, operation S911 to operation S913 are directly performed. When determining that the PEI program block in the primary BIOS is incomplete, the electronic device may not need to determine whether the PEI program block in the secondary BIOS is complete, and directly determine the PEI program block in the secondary BIOS as the target PEI program block. Then, operation S906 to operation S9010 are directly performed.

In some other embodiments, the electronic device may determine the target PEI program block only via a version number. When determining that the version number of the PEI program block in the primary BIOS is better, the electronic device may not need to determine the version number of the PEI program block in the secondary BIOS, and directly determine the PEI program block in the primary BIOS as the target PEI program block. Then, operation S911 to operation S913 are directly performed. When determining that the version number of the PEI program block in the secondary BIOS is better, the electronic device may not need to determine the version number of the PEI program block in the secondary BIOS, and directly determine the PEI program block in the secondary BIOS as the target PEI program block. Then, operation S906 to operation S9010 are directly performed.

It can be learned that according to the method for running the boot program provided in this embodiment of this application, the electronic device may determine the PEI program block in the primary BIOS as the target PEI program block or the PEI program block in the secondary BIOS as the target PEI program block by running the shared SEC program block, and then run the target PEI program block and the other program blocks in the BIOS corresponding to the target PEI program block, so that the electronic device can be powered on normally.

Therefore, when the shared SEC program block is undamaged, even though one of the primary BIOS and the secondary BIOS is damaged, the electronic device may still run the PEI program block and other program blocks in the other BIOS, so that a success rate of normal power-on of the electronic device can be increased.

It may be understood that operations performed by the electronic device in this embodiment of this application may alternatively be understood as operations performed by the processor of the electronic device.

The foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

According to the context, the term "when" used in the foregoing embodiments may be interpreted as a meaning of "if". "after". "in response to determining", or "in response to detecting". Similarly, according to the context, the phrase "when it is determined that" or "if (a stated condition or event) is detected" may be interpreted as a meaning of "if it is determined that". "in response to determining". "when (a stated condition or event) is detected", or "in response to detecting (a stated condition or event)".

All or some of the foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer program instructions are loaded and executed on a computer, procedures or functions according to embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive), or the like.

The person of ordinary skill in the art may understand all or some of procedures of the methods in embodiments may be implemented by a computer program instructing related hardware. The program may be stored in the computer-readable storage medium. When the program is run, the procedures of the methods in embodiments are performed. The foregoing storage medium includes any medium that can store program code, for example, a ROM, a random access memory (RAM), a magnetic disk, or an optical disc.

In summary, what is described above is merely embodiments of the technical solutions of this application, but is not intended to limit the protection scope of this application. Any modification, equivalent replacement, and improvement made in accordance with disclosure of this application shall be included in the protection scope of this application.

What is claimed is:

1. A method for running a boot program of an electronic device, wherein the electronic device comprises a processor, a first storage, and a second storage, the first storage is a read-only memory from which the processor reads data, and the second storage is a secondary storage from which the processor reads data by using a memory; and the method comprises:
    obtaining, by the processor, a first program block from the first storage and running the first program block, wherein the first program block belongs to a first part of the boot program, and is used to implement security authentication before the boot program is run;
    selecting, by the processor, one of a second program block and a third program block as a target program block in a later operation, wherein the second program block is stored in the first storage, the third program block is stored in the second storage, and both the second program block and the third program block belong to a second part of the boot program, and are configured to run the boot program, wherein first program block is used as a shared program block with the second program block and the third program block; and
    running, by the processor, the target program block after running of the first program block is completed.

2. The method according to claim 1, further comprising:
    checking, by the processor, whether the second program block is damaged or incomplete; and
    in response to the second program block being damaged or incomplete, selecting the third program block as the target program block in the later operation; or
    in response to the second program block being undamaged or complete, selecting the second program block as the target program block in the later operation.

3. The method according to claim 1, further comprising:
    checking, by the processor, whether the second program block and the third program block are damaged or incomplete; and
    in response to one of the second program block and the third program block being damaged or incomplete, selecting an undamaged or complete program block as the target program block in the later operation; or
    in response to both the second program block and the third program block being undamaged or complete, selecting a program block with a better version number as the target program block in the later operation.

4. The method according to claim 1, further comprising the processor selecting a program block with a better version number from the second program block and the third program block as the target program block in the later operation.

5. The method according to claim 2, wherein in response to the processor selecting the third program block as the target program block in the later operation, the method further comprises:

obtaining, by the processor, a boot program block in the third program block from the first storage, and running the boot program block in the third program block, wherein the boot program block in the third program block is used to determine a storage location of the third program block, and load the third program block into a memory of the electronic device.

6. The method according to claim 2, further comprising: repairing, by the processor, a damaged or incomplete program block, or sending, by the processor, a repair notification.

7. The method according to claim 1, further comprising:
obtaining, by the processor, an upgrade package of the boot program; and
selecting, by the processor, one of the second program block and the third program block as an upgrade target, and upgrading a selected program block by using the upgrade package.

8. The method according to claim 1, wherein the boot program is a UEFI BIOS that supports a unified extensible firmware interface specification.

9. A method for upgrading a boot program of an electronic device, wherein the electronic device comprises a processor, a first storage, and a second storage, the first storage is a read-only memory from which the processor reads data, and the second storage is a secondary storage from which the processor reads data by using a memory; and the method comprises:
obtaining, by the processor, an upgrade package of the boot program, wherein a first program block corresponding to a first part of the boot program is stored in the first storage, and the first program block is used to implement security authentication before the boot program is run;
selecting, by the processor, one of a second program block and a third program block as a target program block to be upgraded, wherein the second program block is stored in the first storage, the third program block is stored in the second storage, and both the second program block and the third program block belong to the second part of the boot program, and are configured to run the boot program, wherein first program block is used as a shared program block with the second program block and the third program block; and
upgrading, by the processor, the target program block based on the upgrade package of the boot program.

10. An electronic device comprising:
a processor;
a first storage being a read-only memory from which the processor reads data, wherein the first storage is configured to store a first program block and a second program block, the first program block belongs to a first part of a boot program and is configured to implement security authentication before the boot program is run, and the second program block belongs to a second part of the boot program and is configured to run the boot program; and
a second storage being a secondary storage from which the processor is to read data by using a memory, wherein the second storage stores a third program block that belongs to the second part of the boot program and is configured to run the boot program, wherein first program block is used as a shared program block with the second program block and the third program block;
wherein the processor is configured to:
obtain the first program from the first storage, and run the first program block to implement security authentication before the boot program is run;
select one of the second program block and the third program block as a target program block in a later operation; and
in response to running of the first program block being complete, run the target program block to run the boot program.

11. The electronic device according to claim 10, wherein the processor is further configured to check whether the second program block is damaged or incomplete; and
in response to the second program block being damaged or incomplete, the processor is configured to select the third program block as the target program block in the later operation; or
in response to the second program block being undamaged or complete, the processor is configured to select the second program block as the target program block in the later operation.

12. The electronic device according to claim 10, wherein the processor is further configured to check whether the second program block and the third program block are damaged or incomplete; and
in response to either of the second program block and the third program block being damaged or incomplete, the processor is configured to select an undamaged or complete program block as the target program block in the later operation; or
in response to both the second program block and the third program block being undamaged or complete, the processor is configured to select a program block with a better version number as the target program block in the later operation.

13. The electronic device according to claim 10, wherein the processor is configured to select a program block with a better version number from the second program block and the third program block as the target program block in the later operation.

14. The electronic device according to claim 11, wherein when selecting the third program block as the target program block in the later operation, the processor is further configured to obtain a boot program block in the third program block from the first storage, and run the boot program block in the third program block, wherein the boot program block in the third program block is used to determine a storage location of the third program block, and load the third program block into a memory of the electronic device.

15. The electronic device according to claim 11, wherein the processor is further configured to repair a damaged or incomplete program block, or send a repair notification.

16. The electronic device according to claim 10, wherein the processor is further configured to obtain an upgrade package of the boot program, select one of the second program block and the third program block as an upgrade target, and upgrade a selected program block by using the upgrade package.

* * * * *